US012573768B1

(12) United States Patent
Eisenhart

(10) Patent No.: US 12,573,768 B1
(45) Date of Patent: Mar. 10, 2026

(54) DIRECTIONAL ANTENNA SYSTEM

(75) Inventor: Robert L. Eisenhart, Woodland Hills, CA (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 07/871,149

(22) Filed: Apr. 20, 1992

(51) Int. Cl.
*H01Q 21/28* (2006.01)

(52) U.S. Cl.
CPC .................................. *H01Q 21/28* (2013.01)

(58) Field of Classification Search
CPC ...................................................... H01Q 21/28
See application file for complete search history.

(56) References Cited

U.S. PATENT DOCUMENTS 2,432,858 A * 12/1947 Brown ...................... G01S 1/02 343/792
3,611,389 A * 10/1971 Coors ...................... H01Q 1/38 343/730
4,194,207 A * 3/1980 Zauscher .................. G01S 3/16 342/434
4,613,866 A * 9/1986 Blood ................ G05B 19/4207 324/207.13
5,315,308 A * 5/1994 Nehorai .................. G01S 3/146 342/448
5,399,999 A * 3/1995 Eisenhart .................. H01P 1/16 315/5
5,661,489 A * 8/1997 Baker ...................... H01Q 3/24 342/383
8,686,913 B1 * 4/2014 Schuman ................ G01S 3/143 342/438
10,897,091 B2 * 1/2021 Ramirez .................. H01Q 1/36
2019/0221948 A1 * 7/2019 Ramirez .................. H01Q 9/30

FOREIGN PATENT DOCUMENTS

CN 107317092 A * 11/2017 ............. H01Q 21/29
DE 872379 * 3/1953 ..................... 343/727
FR 2616549 A1 * 12/1988 ........... G01R 31/085
FR 2968086 A1 * 6/2012 ............. H01Q 9/285
WO WO-2016099009 A1 * 6/2016 ........... H04B 7/0456

* cited by examiner

*Primary Examiner* — Daniel Pihulic

(57) ABSTRACT

A directional antenna system 10. The invention includes four independent antenna elements 14, 16, 18 and 20, each configured to provide a specific set of characteristics. When used for reception, the outputs from these elements are uniquely related and processed to determine the direction of a source emitter relative to the positioning of the elements independent of the polarization of the radiated energy.

4 Claims, 6 Drawing Sheets

Sensor 1 - $\hat{\theta}_x$

Sensor 2 - $\hat{\theta}_y$

Sensor 3 - $\hat{\theta}_z$

Sensor 4 - $\hat{\phi}_z$

FIG. 6a.
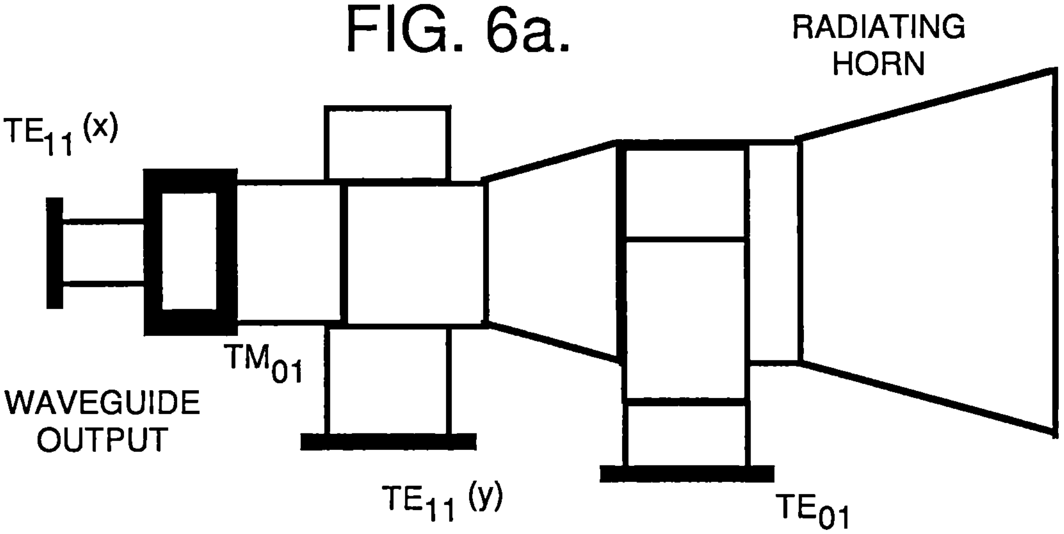
FIG. 6b.
INTERNAL
CROSS-SECTIONS
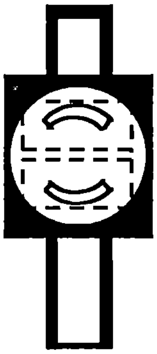
FIG. 6c.
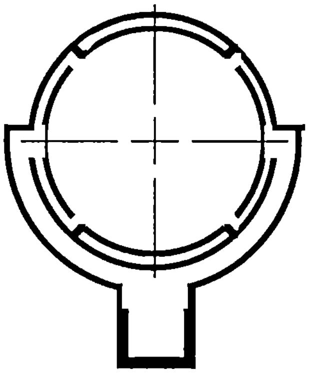
FIG. 6d.
FIG. 6e.
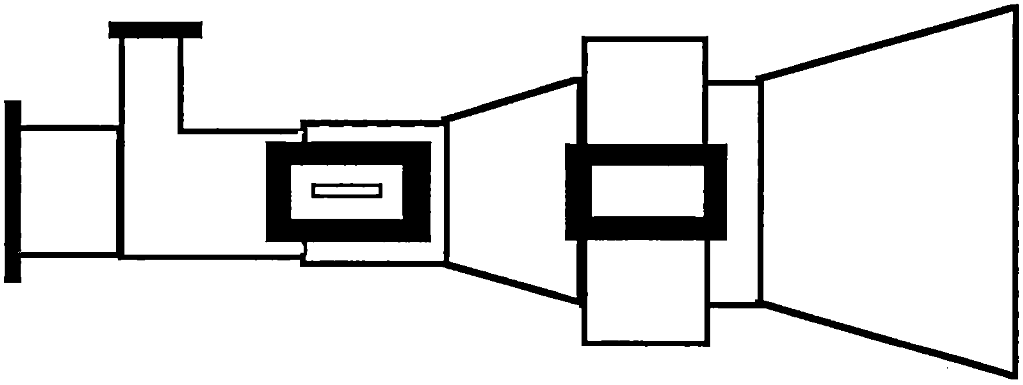

DIRECTIONAL ANTENNA SYSTEM

BACKGROUND OF THE INVENTION

Field of the Invention

The present invention relates to guidance systems. More specifically, the present invention relates to direction finding antennas used in missile guidance systems.

While the present invention is described herein with reference to illustrative embodiments for particular applications, it should be understood that the invention is not limited thereto: Those having ordinary skill in the art and access to the teachings provided herein will recognize additional modifications, applications, and embodiments within the scope thereof and additional fields in which the present invention would be of significant utility.

Description of the Related Art

Missile seekers are employed to guide missiles onto targets. Many seeker technologies are known in the art. Radio Frequency (RF) seekers operate in the radio frequency range of the electromagnetic energy spectrum. Radar seekers, for example, are active RF seekers which transmit a pulse at a selected frequency and receive an echo of the transmitted pulse.

For certain applications, particular seeker technologies are preferred. For antiradiation homing applications, for example, the RF seeker is totally passive. Antiradiation homing (ARH) involves the terminal guidance of a missile to target sources of RF radiation. This mode of operation does not require radiation by the missile guidance system and is therefore "quiet", allowing approach by the missile without revealing itself by its emissions.

In some applications, ARH is a counter counter-measure by which the missile is designed to home in on a transmission intended to jam the operation of say an active radar seeker. Another application is to seek out communications, ground control, or other radiator types which are high value targets.

The communications role requires a passive, low frequency operation as the radiators are generally VHF operating in the VHF and UHF ranges (30 Mhz to 500 Mhz). However, in a passive mode of operation, no control is afforded over the frequency and polarization of the incoming signal. Accordingly, there is a need in the art system having a broad for a passive mode antenna frequency range effective for any polarization.

SUMMARY OF THE INVENTION

The need in the art is addressed by the present invention which provides a directional antenna having first, second, third and fourth elements providing first, second, third and fourth radiation sensitivity patterns, respectively. The first element provides a first electric field radiation sensitivity pattern $\hat{\theta}_x$ of uniform amplitude and linear vertical polarization in an x, y, and z coordinate system where the z axis represents a boresight from the antenna system. The second element is disposed in a plane of the first element and has a common midsection therewith at a center of the antenna system. The second element provides a second electric field radiation sensitivity pattern $\hat{\theta}_y$ of uniform amplitude and linear horizontal polarization. The center of the antenna system is the origin thereof. The third element provides a third electric field radiation sensitivity pattern $\hat{\theta}_z$ having an amplitude proportional to a first angle $\theta_z$ between the z axis and a line-of-sight from the origin of the antenna system to a target and radial polarization. The fourth element provides a fourth electric field radiation sensitivity pattern $\hat{\phi}_z$ having an amplitude proportional to the first angle $\theta_z$ and tangential polarization. In a particular embodiment, a processing system is included for extracting signals from each element and providing directionality signals in response thereto. The invention thus provides a passive antenna system effective over a broad range of frequencies regardless of the polarization in the incoming signal.

BRIEF DESCRIPTION OF THE DRAWINGS

FIGS. 6*a-e* depict various views of a circular waveguide alternative embodiment of the antenna of the present invention.

DESCRIPTION OF THE INVENTION

Illustrative embodiments and exemplary applications will now be described with reference to the accompanying drawings to disclose the advantageous teachings of the present invention.

Figure 1:
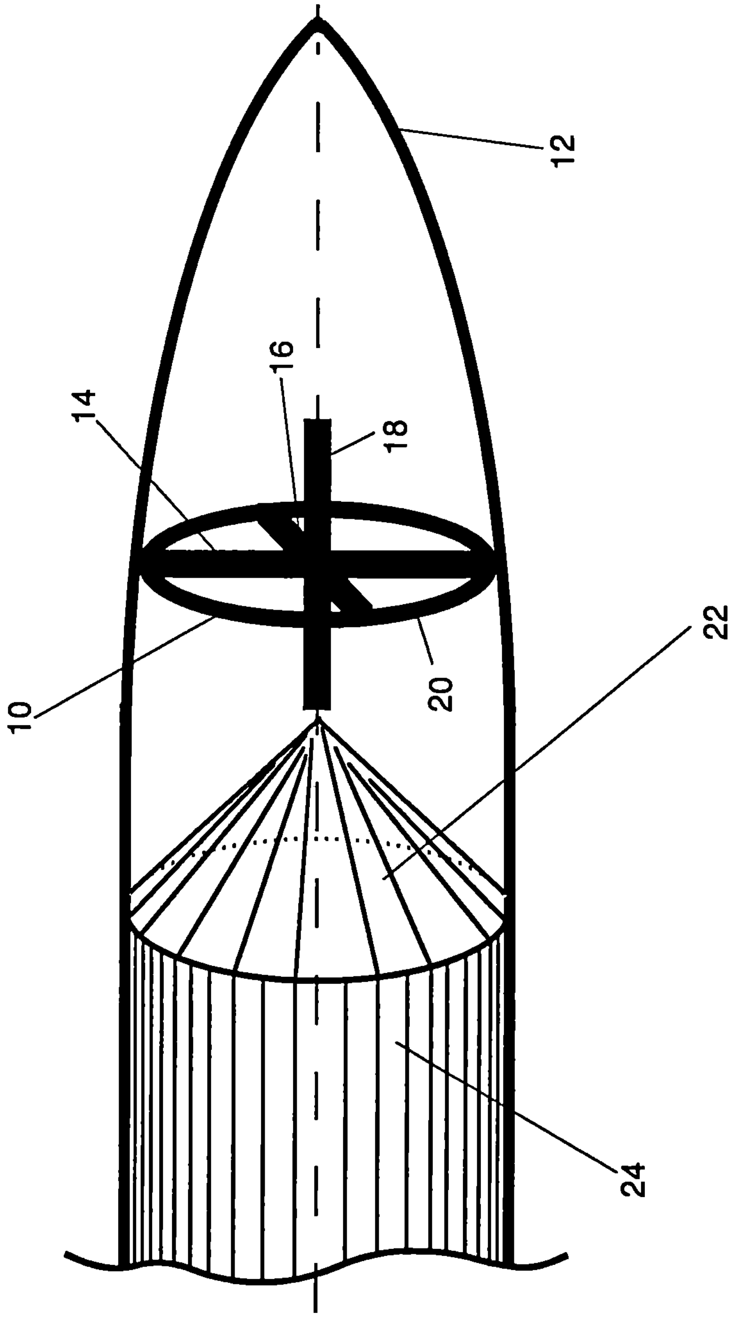
FIG. 1 is a perspective view of a directional antenna constructed in accordance with the present teachings.

FIG. 1 is a perspective view of the directional antenna 10 of the present invention mounted in the nose cone 12 of a missile. The antenna array 10 includes first, second and third linear antenna elements 14, 16 and 18 respectively, and a fourth antenna element 20. The first antenna element 14 is fed in the middle and serves as an x axis electric dipole antenna element. The second antenna element 16 is mounted orthogonal to the first element 14 and is also center fed to serve as a y axis electric dipole antenna element. The third antenna element 18 is mounted orthogonal to the first and second elements 14 and 16 and is center fed to serve as a z axis electric dipole antenna element. In the illustrative embodiment, each linear element is of equal length and less than or equal to ½ a wavelength in length. It is a significant feature of the present invention that directional information for these small elements is established by their patterns which are independent of frequency when the elements are less than λ/2 in length, allowing operation over a wide frequency band.

The fourth antenna element 20 is a loop in the plane of the x and y axis dipoles and is commonly referred to as a z axis magnetic dipole. The fourth antenna element 20 provides a z axis magnetic loop. It would be symmetrically fed at the four junctions at the ends of the x and y dipoles. The reflector cone 22 insures minimum interference due to reflection off the missile body 24. The the loop antenna may be mounted in a plane parallel to the plane between any two antenna elements without departing from the scope of the present teachings.) The orientation of each of the four elements is effective to provide minimal coupling therebetween. Each of the elements is of conventional antenna construction and is fed individually.

Figure 2A:
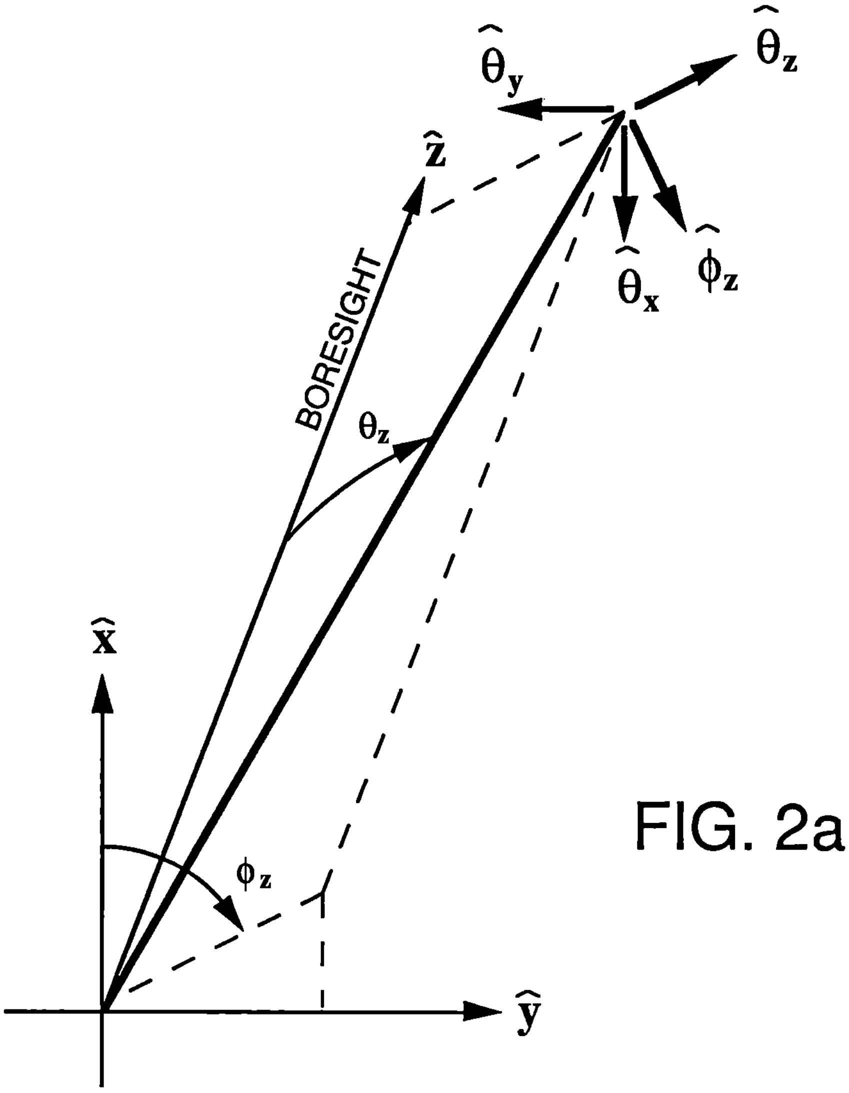
FIG. 2(*a*) defines the coordinate reference system for the directional antenna constructed in accordance with the present teachings with boresight being the z axis.
FIG. 2*b* defines the polarization angle γ in the transverse plane of the directional antenna constructed in accordance with the present teachings and is the angle between the x axis and the incident transverse electric field $\hat{E}_i$.

FIG. 2(*a*) defines the coordinate reference system for the antenna 10 with boresight being the z axis. The unit vectors $\hat{\theta}_x$, $\hat{\theta}_y$, $\hat{\theta}_z$, and $\hat{\phi}_z$ represent the directions of sensitivity of the four antenna elements 14, 16, 18 and 20, respectively, which are located at the origin, and the angles $\theta_z$ and $\phi_z$ establish the direction to the target.

Figure 2B:
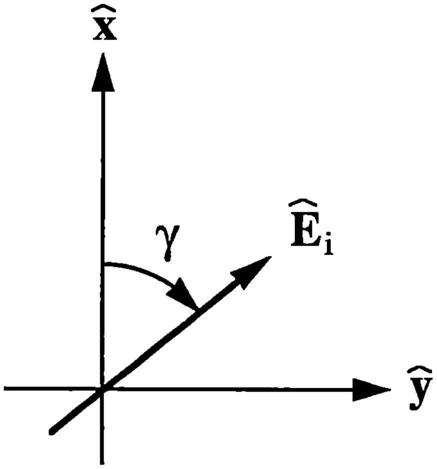
Figure 3A:
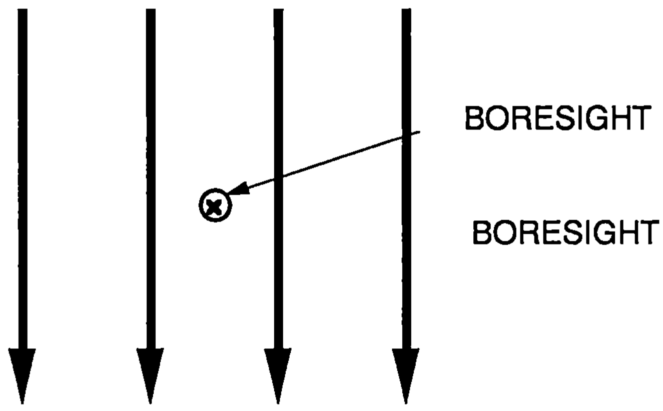
FIGS. 3*a*-3*d* are graphical representations of the electric field for four patterns as seen relative to boresight in the plane of the target for each of four antenna elements of the directional antenna constructed in accordance with the present teachings.
Figure 3B:
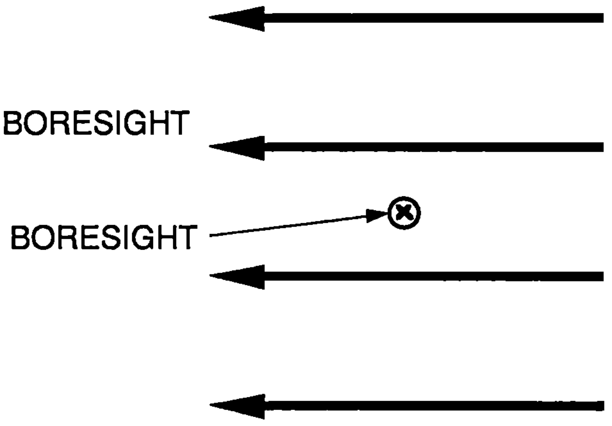
Figure 3C:
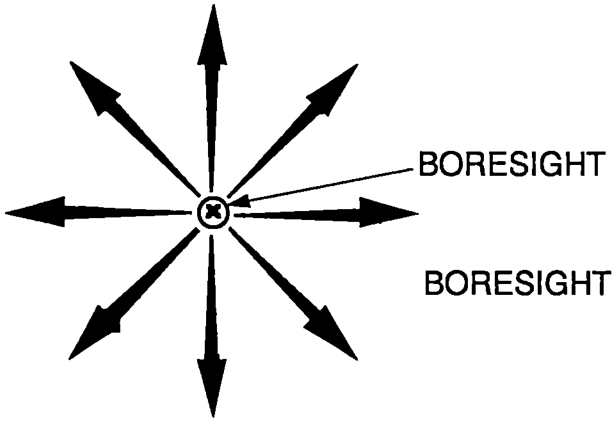
Figure 3D:
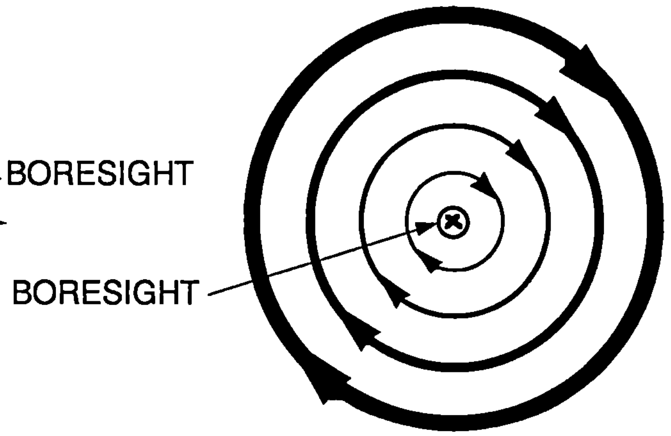

FIG. 2*b* defines the polarization angle $\gamma$ in the transverse plane of the antenna system 10 and is the angle between the x axis and the incident transverse electric field $\hat{E}_i$.

FIGS. 3*a*, 3*b*, 3*c*, and 3*d* are graphical representations of the electric field for the four fundamentally required patterns as seen relative to boresight in the plane of the target for each of four antenna elements 14, 16, 18 and 20, respectively, of the directional antenna 10. The characteristics of these antenna elements are:

Sensor 1: Uniform amplitude and linear vertical polarization $\hat{\theta}_x$.

Sensor 2: Uniform Amplitude and linear horizontal polarization $\hat{\theta}_y$.

Sensor 3: Amplitude proportional to theta $\theta_z$ with radial polarization $\hat{\theta}_z$.

Sensor 4: Amplitude proportional to theta $\theta_z$ with tangential polarization $\hat{\phi}_z$.

where the first antenna element 14 is the first sensor, the second antenna element 16 is the second sensor, the third antenna element 18 is the third sensor, and the fourth antenna element 20 is the fourth sensor.

Given an incident electric field value of $\hat{E}_i$ at an orientation of angle $\gamma$ with respect to the x axis, then the feed voltages generated at the outputs of these four antenna elements are respectively:

$$V_V = k\hat{E}_i \cdot \hat{\theta}_x = kE_i \cos(\gamma), \quad [1]$$

$$V_H = k\hat{E}_i \cdot \theta_y = kE_i \sin(\gamma), \quad [2]$$

$$V_\Theta = k\theta_z \hat{E}_i \cdot \hat{\theta}_z = k\theta_z E_i \cos(\phi_z - \gamma), \text{ or } V_\Theta = k\theta_z E_i[\cos(\phi_z)\cos(\gamma) + \sin(\phi_z)\sin(\gamma)] \quad [3]$$

and $$V_\phi = k\theta_z \hat{E}_i \cdot \hat{\phi}_z = k\theta_z E_i \sin(\gamma - \phi_z), \text{ or } V_\phi = k\theta_z E_i[\cos(\phi_z)\sin(\gamma) - \sin(\phi_z)\cos(\gamma)] \quad [4]$$

If we then define the azimuthal and elevation guidance signals $\sigma_{az}$ and $\sigma_{el}$ respectively as:

$$\sigma_{az} \equiv \theta_z \sin(\phi_z) \quad [5]$$

and $$\sigma_{el} \equiv \theta_z \cos(\phi_z) \quad [6]$$

Substituting equations 1, 2, 5, and 6 into equations 3 and 4 yields:

$$V_\Theta = \sigma_{el} V_V + \sigma_{az} V_H,$$

$$V_\phi = \sigma_{el} V_H - \sigma_{az} V_V$$

Solving for $\sigma_{az}$ and $\sigma_{el}$ gives:

$$\sigma_{az} = \frac{V_\Theta V_H - V_\phi V_V}{(V_H^2 + V_V^2)} \quad [7]$$

$$\sigma_{el} = \frac{V_\Theta V_V + V_\phi V_H}{(V_H^2 + V_V^2)} \quad [8]$$

which is dependent only on the four element voltages. Note, in particular, the independence from the polarization angle $\gamma$.

Figure 4:
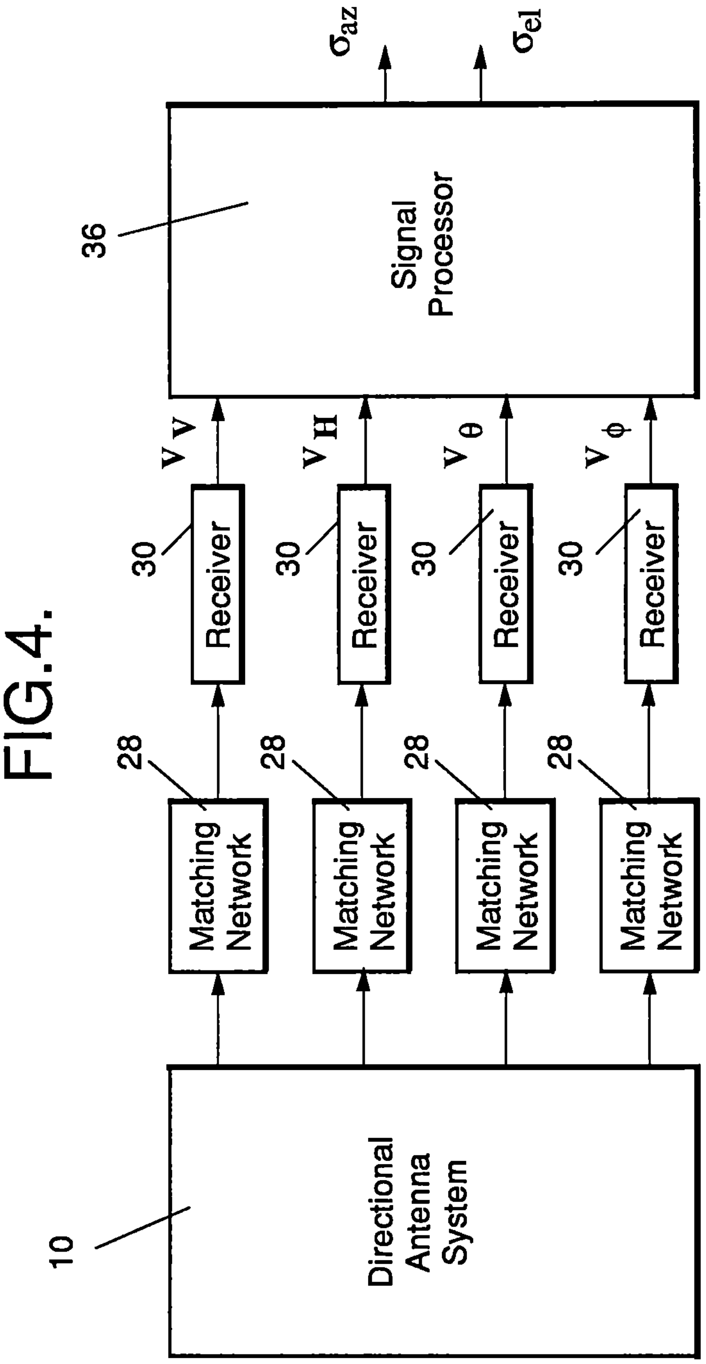
FIG. 4 is a block diagram of an illustrative embodiment of a receiver system for extracting signals from each of the antenna elements of the directional antenna of the present invention and providing the directional azimuthal and elevational guidance signals $\sigma_{az}$ and $\sigma_{el}$ respectively in response thereto.

FIG. 4 is a block diagram of an illustrative embodiment of a receiver system 26 for extracting signals from each of the antenna elements and providing the directional azimuthal and elevational guidance signals $\sigma_{az}$ and $\sigma_{el}$ respectively. The system 26 includes a matching network 28 for each element. The output from each matching network 28 is downconverted and filtered in a conventional manner by a receiver 30. Although the matching networks 28 and the receivers 30 may be of conventional design, in the preferred embodiment, the matching is done electronically and may be different for each element. The receivers provide input signals $V_V$, $V_H$, $V_\Theta$ and $V_\phi$ from the first, second, third and fourth antenna elements respectively to a signal processor 36.

Figure 5:
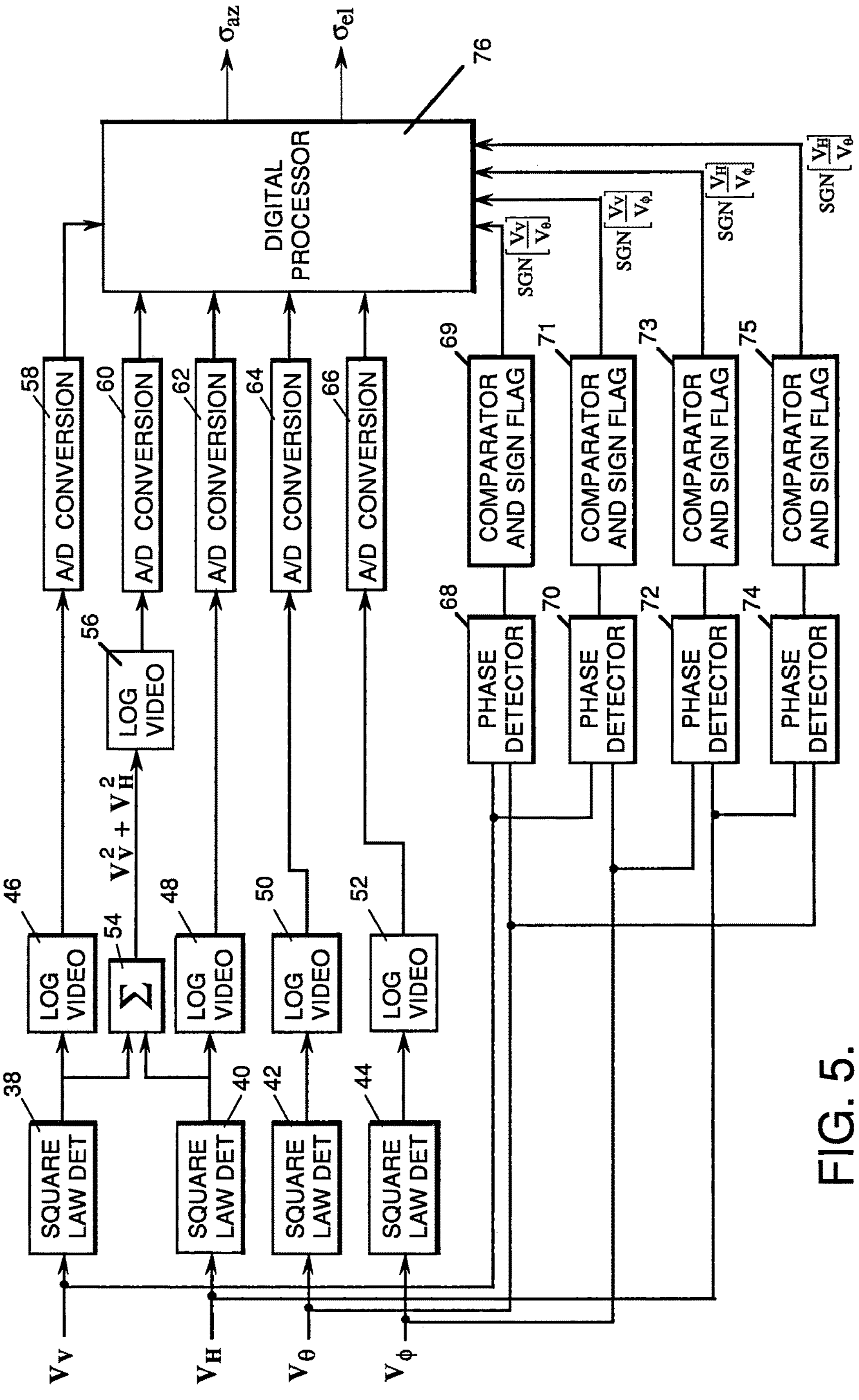
FIG. 5 is a block diagram of an illustrative implementation of the signal processor of the receiver of FIG. 4.

FIG. 5 is a block diagram of an illustrative implementation of the signal processor 36 of FIG. 4. The signal processor 36 includes a plurality of square law detectors 38, 40, 42 and 44 which receive $V_V$, $V_H$, $V_\Theta$ and $V_\phi$ as inputs, respectively. The inputs to the square law detectors are squared and provided to a respective log video detector 46-52 (even numbers only). The log video detectors accommodate input signals of a wide dynamic range. In addition, the square of the x axis and y axis feed voltages from the first and second square law detectors 38 and 40 are input to a summing circuit 54. The output of the summing circuit 54 is input to a fifth log video detector 56. The output of each log video detector is digitized by one of a plurality of corresponding analog-to-digital converters 58-66 (even numbers only) and provided to a digital signal processor 76.

Four phase detectors 68-74 (even numbers only) are used to provide the phases of the ratios of the x axis feed voltage $V_V$ to the z axis dipole feed voltage $V_\Theta$, the x axis feed voltage $V_V$ to the z axis loop feed voltage $V_\phi$, the y axis feed voltage $V_H$ to the z axis loop feed voltage $V_\phi$, and the y axis feed voltage $V_H$ to the z axis dipole feed voltage $V_\Theta$, respectively. Four comparator and sign flag generator circuits are provided 69-75 (odd numbers only) for providing an output indicative of the sign of the phase of each of the ratios provided by the phase detectors 68-74, respectively.

The digital processor 76 receives the digitized signals from the A/D convertors 58-66 along with the sign bits from the four comparator and sign flag generator circuits 69-75 and implements equations [7] and [8] to provide the guidance signals $\sigma_{az}$ and $\sigma_{el}$ respectively.

The hardware realization of the invention is possible in many forms, which would be dependent on requirements. One such need is to have a system which will operate over a wide frequency range and be small (<λ/2) in any dimension. This system would only need coverage or visibility for the solid angle represented by a cone where $\theta_z$<45 degrees. Short electric and magnetic dipole elements satisfy all requirements but are poorly matched. If electronic matching is employed, it is possible to tune dipoles across a broad range.

Therefore consider a system such as shown in FIG. 1 inside the nose cone which uses small electric dipoles for each of the first three elements, oriented along the x, y, and z axes of a rectangular coordinate system, and a magnetic dipole (loop) aligned with the z axis. These elements all match the orientation requirements and approximate quite closely the amplitude characteristics, approaching exact conditions on boresight where the greatest accuracy is needed. Such a set of dipoles provide the forward looking coverage required. In accordance with specific teachings, the centers of all four elements are co-located but electrically isolated from each other. Each of the elements is of conventional antenna construction and is fed individually.

The feed voltage for the small dipole 14 corresponding to equation [1] is:

$$V_V=k_d(1-\sin^2(\theta_z)\cos^2(\phi_z))^{1/2}\hat{\theta}_x\cdot\hat{E}_i \qquad [9]$$

Since $(1-\sin^2(\theta_z)\cos^2(\phi_z))^{1/2}\approx 1$ for $\hat{\theta}_z<45$ degrees, and any $\phi_z$ then $$V_V=>k_d\hat{\theta}_x\cdot\hat{E}_i=k_dE_i\cos(\gamma)$$

which is the same as equation [1].

Similarly, the voltage for the small dipole 16 corresponding to equation [2] is:

$$V_H=k_d(1-\sin^2(\theta_z)\sin^2(\phi_2))^{1/2}\hat{\theta}_y\cdot\hat{E}_i \qquad [10]$$

and also since $(1-\sin^2(\theta_z)\sin^2(\phi_z))^{1/2}\approx 1$ for $\hat{\theta}_z<45$ degrees, and any $\phi_z$ then $$V_H=>k_d\hat{\theta}_y\cdot\hat{E}_i=k_dE_i\sin(\gamma)$$

which is the same as equation [2].

For the small dipole 18, $$V_\theta=k_d\theta_z\hat{\theta}_z\cdot\hat{E}_i=k_d\theta_zE_i\cos(\phi_z-\gamma)\text{ or }V_\theta=k_d\theta_zE_i[\cos(\phi_z)\cos(\gamma)+\sin(\phi_z)\sin(\gamma)] \qquad [11]$$

as in equation [3], and for the small dipole 20, $$V_\phi=k_l\theta_z\hat{\phi}_z\cdot\hat{E}_i=k_l\theta_zE_i\sin(\gamma-\phi_z),V_\phi=k_l\theta_zE_i[\cos(\phi_z)\sin(\gamma)-\sin(\phi_z)\cos(\gamma)] \qquad [12]$$

as in equation [4], where the scalar $k_l$ is different from $k_d$ but the difference can be accounted for in the matching process. As shown, the ideal characteristic equations [1-4] can be closely approximated by the real characteristics of the dipoles of the system 10 of the present invention. Therefore this configuration represents a viable approach to use of the present teachings.

A second system, also meeting the fundamental requirements for the four sensory patterns indicated in FIG. 3 can be realized using a circular waveguide receiving aperture (e.g., a conical horn) with approximate coupling ports sensitive to the appropriate modes. As illustrated in FIGS. 6*a-e*, this circular waveguide system would have a narrower frequency range, and be larger relative to wavelength, however, it could be much more precise in pointing accuracy and system sensitivity. The frontal acceptance angle for this system would be much smaller than for the dipole system. However, a larger scanning volume could be obtained by gimballing the antenna. The first two antenna elements would be realized using $TE_{11}$ modes oriented at right angles to one another, corresponding to the x and y axes and producing $V_V$ and $V_H$. The third element would use the $TM_{01}$ mode producing $V_\theta$ and the fourth element would use the $TE_{01}$ mode producing $V_\phi$. These correspond to the z axis electric and magnetic dipoles, respectively. Each of these modes would require a separate output from the circular waveguide and would use the same processing as previously discussed in regard to FIGS. 4 and 5.

Thus, the present invention has been described herein with reference to particular embodiments for particular applications. Those having ordinary skill in the art and access to the present teachings will recognize additional modifications, applications and embodiments within the scope thereof. For example, the invention is not limited to the use of a loop antenna. Those skilled in the art will appreciate that a plurality of dipole antennas may be used in place of the loop antenna without departing from the scope of the present teachings. Further, the invention is not limited to the number and arrangement of the various antenna elements shown in the illustrative embodiments. Various numbers of elements may be used in a variety of arrangements without departing from the scope of the present teachings. Further, the invention is not limited to use with the system shown for extracting and processing the feed voltages provided by the antenna elements. Other extracting and processing circuits may be employed as will be appreciated by those skilled in the art.

It is therefore intended by the appended claims to cover any and all such applications, modifications and embodiments within the scope of the present invention Accordingly,

What is claimed is:

1. A directional antenna and signal processing system for a missile comprising:

first means including a first linear antenna element for providing an x axis output voltage $V_V$;

second means including a second linear antenna element mounted in orthogonal coplanar alignment with said first antenna element providing a y axis output voltage $V_H$;

third means including a third linear antenna element mounted in orthogonal alignment with said first and second antenna elements providing a z axis output signal $V_\Theta$;

fourth means including a fourth antenna element, said fourth antenna element being a loop antenna coplanar with said first and second elements providing a second z axis output signal $V_\phi$; and means for processing signals provided by each of said antenna elements to provide output azimuth and elevation directionality signals $^\sigma$az and $^\sigma$el by implementing the equations:

$$\sigma_{az}=\frac{V_\Theta V_H-V_\phi V_V}{(V_H^2+V_V^2)}$$

$$\sigma_{el}=\frac{V_\Theta V_V+V_\phi V_H}{(V_H^2+V_V^2)}.$$

2. A method for providing a directional output signal including the steps of:

a) providing an x axis electric dipole output signal $V_V$;

b) providing a y axis electric dipole output signal $V_H$, said y axis being orthogonal to said x axis;

c) providing a z axis output electric dipole signal $V_\Theta$, said z axis being orthogonal with said x and y axes;

d) providing a z axis magnetic loop output signal $V_\phi$, said z axis being coplanar with said x and y axes; and e) processing each of said signals to provide output azimuth and elevation directionality signals $^\sigma$az and $^\sigma$el by implementing the equations:

$$\sigma_{az}=\frac{V_\Theta V_H-V_\phi V_V}{(V_H^2+V_V^2)}$$

-continued $$\sigma_{el} = \frac{V_\Theta V_V + V_\phi V_H}{\left(V_H^2 + V_V^2\right)}.$$

3. A directional antenna system comprising:

first means for providing a first electric field radiation sensitivity pattern $\hat{\Theta}_x$ of uniform amplitude and linear vertical polarization in an x, y, and z coordinate system where the z axis represents a boresight from said antenna system and providing an x axis output voltage $V_V$;

second means disposed in a plane of said first means and having a common midsection therewith at a center of said antenna system for providing a second electric field radiation sensitivity pattern $\hat{\Theta}_y$ of uniform amplitude and linear horizontal polarization, said center of said antenna system being the origin thereof and providing a y axis output voltage $V_H$;

third means for providing a third electric field radiation sensitivity pattern $\hat{\Theta}_z$ having an amplitude proportional to a first angle $\hat{\Theta}_z$ between said z axis and a line-of-sight from said origin of said antenna system to a target and radial polarization and providing a first z axis output signal $V_\Theta$;

fourth means for providing a fourth electric field radiation sensitivity pattern $\hat{\phi}_z$ having an amplitude proportional to said first angle $\Theta_z$ and tangential polarization and providing a second z axis output signal $V_\phi$; and means for processing signals provided by each of said antenna elements to provide output azimuth and elevation directionality signals $^{\sigma}$az and $^{\sigma}$el by implementing the equations:

$$\sigma_{az} = \frac{V_\Theta V_H - V_\phi V_V}{\left(V_H^2 + V_V^2\right)}$$

-continued $$\sigma_{el} = \frac{V_\Theta V_V + V_\phi V_H}{\left(V_H^2 + V_V^2\right)}.$$

4. A method for providing a directional output signal including the steps of:

providing a first electric field radiation sensitivity pattern $\hat{\theta}_x$ of uniform amplitude and linear vertical polarization in an x, y, and z coordinate system where the z axis represents a boresight from said antenna system and an x axis output voltage $V_V$;

providing a second electric field radiation sensitivity pattern $\hat{\theta}_y$ of uniform amplitude and linear horizontal polarization and a y axis output voltage $V_H$;

providing a third electric field radiation sensitivity pattern $\hat{\theta}_z$ having an amplitude proportional to a first angle $\theta_z$ between said z axis and a line-of-sight to a target with radial polarization and a first z axis output signal $V_\Theta$;

providing a fourth electric field radiation sensitivity pattern $\phi_z$ having an amplitude proportional to said first angle $\theta_z$ with tangential polarization and a second z axis output signal $V_\phi$; and processing signals provided by each of said antenna elements to provide output azimuth and elevation directionality signals $\sigma_{AZ}$ and $\sigma_{EL}$ respectively, in accordance with the following equations:

$$\sigma_{az} = \frac{V_\Theta V_H - V_\phi V_V}{\left(V_H^2 + V_V^2\right)}$$

$$\sigma_{el} = \frac{V_\Theta V_V + V_\phi V_H}{\left(V_H^2 + V_V^2\right)}.$$

* * * * *